United States Patent [19]

Stewart

[11] 4,327,995

[45] May 4, 1982

[54] BAR PIN FOR USE IN TORQUE RODS

[75] Inventor: Ross E. Stewart, Norwalk, Ohio

[73] Assignee: Gould Inc., Rolling Meadows, Ill.

[21] Appl. No.: 19,484

[22] Filed: Mar. 12, 1979

[51] Int. Cl.³ .............................................. F16C 11/00
[52] U.S. Cl. ..................................... 403/224; 280/721
[58] Field of Search ............... 403/221, 224, 225, 228,
403/161, 162, 163, 267/57, 57.1 R, 57.1 A;
180/73 TT; 308/238; 280/721, 723

[56] References Cited

U.S. PATENT DOCUMENTS

| | | | |
|---|---|---|---|
| 2,049,024 | 7/1936 | Robertson | 403/228 |
| 2,855,232 | 10/1958 | Kozak | 403/226 X |
| 2,952,486 | 9/1960 | Reuter et al. | 403/162 X |
| 3,094,376 | 6/1963 | Thomas | 308/238 X |
| 3,139,311 | 6/1964 | Melton et al. | 308/238 X |
| 3,408,124 | 10/1968 | Melton et al. | 308/238 |
| 4,007,924 | 2/1977 | Jorn et al. | 403/228 X |
| 4,057,304 | 11/1977 | Gaines et al. | 308/238 X |
| 4,158,511 | 6/1979 | Herbenar | 403/225 X |

Primary Examiner—Andrew V. Kundrat
Attorney, Agent, or Firm—Russell E. Baumann; Edward E. Sachs; Barry L. Tummino

[57] ABSTRACT

A bar or straddle pin construction is disclosed for use in torque rods, the pin having an elongated metal inner member surrounded by a plastic outer member in which the plastic outer member tightly engages the inner member such that the two members are coaxially aligned. The inner member is configured to contemporaneously provide a means to aid in the bonding between itself and the plastic outer member and a means to aid in the external connection of the torque rod.

8 Claims, 5 Drawing Figures

BAR PIN FOR USE IN TORQUE RODS

BACKGROUND OF THE INVENTION

The present invention relates to torque rods and is more particularly directed to the bar or straddle pin component of a torque rod of the type commonly used in vehicle reaction rod units and the like.

Typically, prior art bar or straddle pins in torque rods have been made of solid metal such as steel. These bars are forged or machined from larger pieces of solid metal stock to the dimensions required for torque rod assembly. Tab ends, which are flat surfaces on the ends of the bar used for external connection purposes, are often machined. During the machining of these tab ends, stress riser grooves, cuts, etc. can occur, thus creating stress propagation points which tend to weaken the bar's overall structure and therefore reduce its reliability. In addition, the machining is an expensive and time consuming operation.

Another problem with the prior art bar pins is the high wear factor between the solid metal bar pin and the rubber bushing member of the torque rod. This high wear results from slippage between the bar pin and the rubber bushing as a result of time and normal use and the fact tht the metal bar pin surface is abrasive in nature. This abrasive wear problem is even more accentuated when corrosion occurs on the surface of the bar pin as is typical in the environment in which a torque rod is used.

Still another problem with metal bar pins is their weight. The use of the solid metal bar pin contributes to a high overall weight of the torque rod and in turn a higher total vehicle weight for any vehicle using such a torque rod. This increased weight of the torque rod will increase the energy requirements of the vehicle.

OBJECTS OF THE INVENTION

An object of the invention is to provide a bar pin structure in which the metal portion can be drawn in the shape desired thus reducing the overall machining requirements and thus reducing the stress propagation points that machining would produce.

Another object of the invention is to provide a bar pin structure which will not be as conducive to abrasion wear of the rubber bushing in a torque rod and to provide a structure that is less subject to corrosion.

Still another object of this invention is to provide a bar pin that is light in weight, reliable and easy to assemble into torque rods.

The above objects are given only by way of example. Thus, other desirable objectives and advantages achieved by the invention may occur to those skilled in the art. The scope of the invention is to be limited only by the appended claims.

BRIEF SUMMARY OF THE INVENTION

In accordance with the present invention, a combination plastic and metal bar pin is provided for use in torque rods of the type found in vehicle reaction rod units and the like. The bar pin includes a metal inner member and a plastic outer member. The two members are affixed together by molding, applying an adhesive or by press fitting the metal inner member into the outer member. The outer member is configured appropriately to fit into the eye of the torque rod. Typically, such configuration would be circular in shape commensurate with the standard bushed torque rods presently used in the vehicle reaction units.

In accordance with another aspect of the present invention, the inner member has at least one and preferably two flattened sides along its longitudinal axis. The flattened sides are known in the art as tab ends and are provided for connecting the bar pin and the torque rod to an external connector or support bracket. Holes can also be drilled at each end of the inner member, perpendicular to the flattened sides to also aid in the connection of the torque rod to an external connector by use of a bolt.

In still another aspect of the present invention, the inner member is grooved and/or knurled circumferentially along its longitudinal axis over a length equal to that of the plastic outer member in order to aid in securing the two members together and in preventing inner member pull out.

DESCRIPTION OF THE PREFERRED EMBODIMENTS

Figure 1:
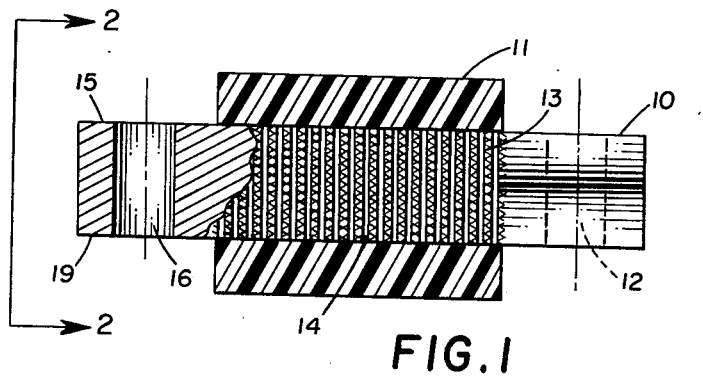
FIG. 1 is a longitudinal view, partially in section, of the invention.

A description of the invention follows, referring to the Figures in which like reference numerals denote like elements of structure in each of the several Figures.

As used in this application, the word "rubber" means a resilient or elastomeric-like material such as high molecular elastic colloid, natural caoutchouo synthetic rubber, synthetic rubber, neoprene, butyl rubber or styrene butadiene. The word "plastic" means any synthetic polyamide materials or polymers of high molecular weight that can be easily molded, cast, extruded, drawn or laminated, such as nylon. Those skilled in the art will realize that materials such as glass fibers, fillers, etc. may be added to the "plastic" without departing from the scope of the invention. The word "bar pin" refers to that component of a torque rod which connects the rod with an external support structure. An alternative name for "bar pin" is "Straddle pin". Often, a rubber bushing is provided between the main torque rod body and the "bar pin". Although a "bar pin" is manufactured as a separate component, when it and the torque rod are assembled, they preferably form an integrated part not easily separated into its basic components. The words "integrated torque rod" or "integrated part" mean the main body of the torque rod combined with a bushing and a bar pin. It should be apparent to those skilled in the art, that the present invention is not limited to bar pins, but also applies to the cantilever component of a torque rod or any solid metal support member that is combined inside an opening of a structure that is lined with a bushing.

Figure 2:
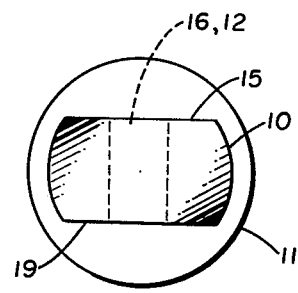
FIG. 2 is an end view taken along line 2—2 of FIG. 1.
Figure 3:
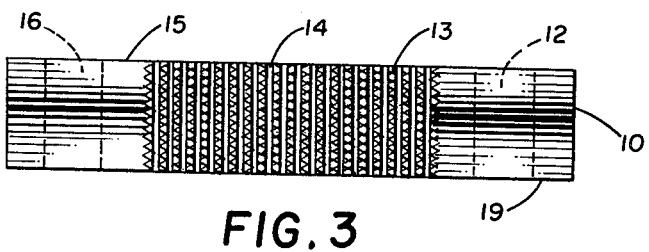
FIG. 3 is a frontal view of the inner members of this invention.

The bar pin design generally shown in FIGS. 1-3, includes a metal inner member 10 and a plastic outer member 11. Typically, metal inner member 10, has an elongated cylindrical body preferably made from steel. The surface of the metal inner member 10 has preferably a knurled portion 13 over at least a portion of member 10 and typically is knurled circumferentially around member 10 over a length equal to that of plastic outer member 11 which will be discussed hereinafter. Moreover, the knurling is also equidistant from the ends of inner member 10. A plurality of grooves 14, can be cut in the surface of inner member 10 perpendicular to the longitudinal axis over a length equal to that of knurling 13. The purpose of the knurling 13 and the grooves 14 is to aid in securing of the inner member 10 and outer member 11 together which will be discussed hereinafter.

Figure 4:
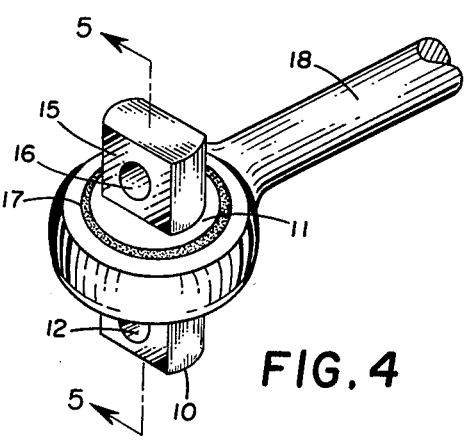
FIG. 4 is a perspective view of the bar pin of this invention as assembled in a rubber bushed torque rod.

The inner member 10 typically has at least one flattened surface 15 to provide a means for connecting the integral torque rod, shown in FIG. 4 to an external connector or support bracket, not shown. FIGS. 1-3 show two flattened surfaces 15 and 19. The two surfaces are preferably parallel planes that run parallel to the longitudinal axis of inner member 10 such that the configuration of inner member 10 remains symetric around the longitudinal axis. The grooves 14 or knurling 13 typically do not occur on the flattened surfaces 15 and 19.

Inner member 10 typically has two holes designated by numerals 12 and 16 through member 10 and perpendicular to flattened surfaces 15 and 10. Moreover, the diameters of holes 12 and 16 will typically be equal. The purpose of these holes is for bolt connection of the integral torque rod, shown by FIG. 4, to an external connector not shown.

Outer member 11 is typically made of nylon and fiberglass. The length of outer member 11 is less than that of inner member 10. More particularily, the length of outer member 11 is less than the distance between the centers of holes 12 and 16 minus the diameter of a hole such that the entire holes 12 and 16 will extend beyond the edges of outer member 11 when the inner member 10 and outer member 11 are secured together.

outer memberr 11 is secured to inner member 10 by molding the outer member 11 to the inner member 10, by use of adhesives, not shown, or by press fitting the members together as is known in the art. The effect is to secure the two members together as a single bar pin unit.

Figure 5:
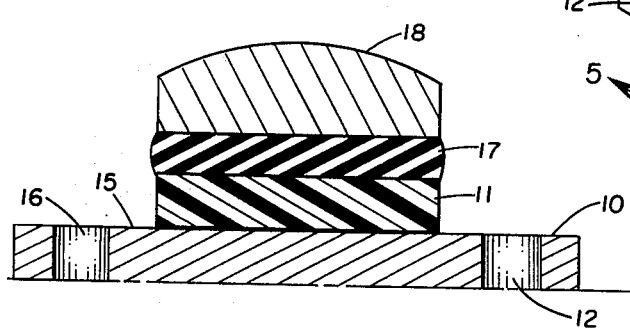
FIG. 5 is a sectional view taken along line 5—5 of FIG. 4 above the center line.

FIGS. 4 and 5 show a typical assembly of this bar pin invention into a bushed torque rod. The main body of the torque rod 18 has an opening at an end to accept the bar pin. The opening is typically lined with a resilient liner or rubber bushing 17. This opening in the torque rod is referred to as the eye of the rod. Accordingly, the bar pin is assembled into the integral torque rod such that the rubber bushing 17 is between the bar pin and the main body of the torque rod 18. A typical process for assembling the bar pin into the eye of the torque rod is "shooting". "Shooting" is the process in which the bar pin is forced into the eye while the rubber bushing is contemporaneously deformed or compressed to allow for this insertion. This process provides for a mechanical bond between the bar pin, the rubber bushing and the torque rod.

Alternately a chemical bonding means or other means as are known in the art can be used for securing the bar pin and rubber in the eye of the rod.

This invention has been described with reference to a preferred embodiment. Obvious modifications and alterations will occur to others upon reading and understanding of this specification. It is my intention to include all such modifications and alterations insofar as they come within the scope of the appended claims or the equivalent thereof.

Having thus described my invention I now claim:

1. A bar pin used in torque rods of the type having an opening and a resilient liner extending at least part way around said opening for supporting said bar pin, said bar pin comprising:
   a rigid inner member, said rigid inner member having at least a partially knurled surface; and
   a plastic outer member surrounding and secured to said rigid inner member at said partially knurled surface, said outer member having an outer dimension to fit within said resilient liner of said torque rod, whereby said torque rod and said bar pin form an essentially integral part.

2. A bar pin of claim 1 wherein said rigid inner member is made from metal.

3. A bar pin of claim 1 wherein said outer member is made from a composite nylon and fiberglass material.

4. A bar pin of claim 1 wherein said outer member has a length less than that of said inner member such that the inner member's end protrudes beyond the outer member.

5. A bar pin of claim 4 wherein said inner member has at least one flattened side running along its longitudinal axis to provide a means of connecting said integral torque rod to an external connector or support bracket.

6. A bar pin used in torque rods of the type having an opening and a resilient liner extending at least part way around said opening for supporting said bar pin, said bar pin comprising:
   a rigid inner member;
   a plastic outer member surrounding and secured to said inner member, said outer member having an outer dimension to fit within said resilient liner of said torque rod, whereby said torque rod and said bar pin form an essentially integral part;
   wherein said outer member has a length less than that of said inner member such that at least one of the inner member's ends protrudes beyond the outer member; and
   wherein said rigid inner member has at least one flattened side running along its longitudinal axis to provide a means of connecting said integral torque rod to an external connector or support bracket.

7. A bar pin of claim 6 wherein said inner member has at least one hole drilled at the protruding end of said inner member perpendicular to said flattened side to provide another means for connection of said external torque rod to an external connector or support bracket.

8. A bar pin used in torque rods in which said torque rod has an opening wherein said bar pin fits in which said opening is at least partially lined with a rubber material, said bar pin comprising:
   a metal inner member having an elongated body;
   a plastic outer member surrounding said inner member wherein said outer member has an outer dimension to fit said opening in said torque rod;
   wherein said inner member is a cylindrical body with two flattened sides along its longitudinal axis such that said sides are parallel planes parallel to the longitudinal axis wherein two holes are placed perpendicular to said planes, one hole in each end of said cylindrical body;
   wherein said outer member has a longitudinal length less than that of said inner member also being less than the spacing between the centers of said holes in said cylindrical body minus the diameter of said holes, wherein said outer member is secured to said inner member; and
   wherein said inner member is at least partially knurled and grooved on its surface where said inner and said outer member are to connect.

* * * * *